United States Patent
Tian et al.

(10) Patent No.: US 8,599,934 B2
(45) Date of Patent: Dec. 3, 2013

(54) SYSTEM AND METHOD FOR SKIP CODING DURING VIDEO CONFERENCING IN A NETWORK ENVIRONMENT

(75) Inventors: Dihong Tian, San Jose, CA (US); Joseph T. Friel, Ardmore, PA (US); Andrew P. Weir, Malvern, PA (US)

(73) Assignee: Cisco Technology, Inc., San Jose, CA (US)

( * ) Notice: Subject to any disclaimer, the term of this patent is extended or adjusted under 35 U.S.C. 154(b) by 466 days.

(21) Appl. No.: 12/877,833

(22) Filed: Sep. 8, 2010

(65) Prior Publication Data
US 2012/0057636 A1    Mar. 8, 2012

(51) Int. Cl.
*H04N 7/12* (2006.01)

(52) U.S. Cl.
USPC ............... 375/240.27; 348/14.07; 348/14.08; 348/14.12; 348/14.13

(58) Field of Classification Search
USPC ............ 375/240.27; 348/14.07, 14.08, 14.12, 348/14.13
See application file for complete search history.

(56) References Cited

U.S. PATENT DOCUMENTS

| | | | |
|---|---|---|---|
| 2,911,462 A | 11/1959 | Brady | |
| D212,798 S | 11/1968 | Dreyfuss | |
| 3,793,489 A | 2/1974 | Sank | |
| 3,909,121 A | 9/1975 | De Mesquita Cardoso | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |
| 4,815,132 A | 3/1989 | Minami | |
| 4,827,253 A | 5/1989 | Maltz | |
| 4,853,764 A | 8/1989 | Sutter | |
| 4,890,314 A | 12/1989 | Judd et al. | |
| 4,961,211 A | 10/1990 | Tsugane et al. | |
| 4,994,912 A | 2/1991 | Lumelsky et al. | |
| 5,003,532 A | 3/1991 | Ashida et al. | |
| 5,020,098 A | 5/1991 | Celli | |
| 5,136,652 A | 8/1992 | Jibbe et al. | |
| 5,187,571 A | 2/1993 | Braun et al. | |
| 5,200,818 A | 4/1993 | Neta et al. | |
| 5,249,035 A | 9/1993 | Yamanaka | |
| 5,255,211 A | 10/1993 | Redmond | |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

U.S. Appl. No. 13/096,772, filed Apr. 28, 2011, entitled "System and Method for Providing Enhanced Eye Gaze in a Video Conferencing Environment," Inventor(s): Charles C. Byers.

(Continued)

*Primary Examiner* — Anner Holder
(74) *Attorney, Agent, or Firm* — Patent Capital Group

(57) ABSTRACT

A method is provided in one example and includes receiving an input video, and identifying values of pixels from noise associated with a current video image within the video input. The method also includes creating a skip-reference video image associated with the identified pixel values, and comparing a portion of the current video image to the skip-reference video image. The method also includes determining a macroblock associated with the current video image to be skipped before an encoding operation occurs.

20 Claims, 4 Drawing Sheets

(56) References Cited

U.S. PATENT DOCUMENTS

| | | |
|---|---|---|
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| D410,447 S | 6/1999 | Chang |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A | 7/2000 | Lumelsky et al. |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,082 B1 | 7/2001 | Yonezawa et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et al. |
| D542,247 S | 5/2007 | Kinoshita et al. |
| 7,221,260 B2 | 5/2007 | Berezowski et al. |
| D545,314 S | 6/2007 | Kim |
| 7,239,338 B2 | 7/2007 | Krisbergh et al. |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| D559,265 S | 1/2008 | Armstrong et al. |
| D560,681 S | 1/2008 | Fletcher |
| D561,130 S | 2/2008 | Won et al. |
| 7,336,299 B2 | 2/2008 | Kostrzewski |
| D567,202 S | 4/2008 | Rieu Piquet |

(56) References Cited

U.S. PATENT DOCUMENTS

| | | |
|---|---|---|
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,616,226 B2 | 11/2009 | Roessler et al. |
| 7,646,419 B2 | 1/2010 | Cernasov |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,889,851 B2 | 2/2011 | Shah et al. |
| 7,894,531 B1 | 2/2011 | Cetin et al. |
| D635,569 S | 4/2011 | Park |
| D635,975 S | 4/2011 | Seo et al. |
| 7,939,959 B2 | 5/2011 | Wagoner |
| 7,990,422 B2 | 8/2011 | Ahiska et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,130,256 B2 | 3/2012 | Trachtenberg et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| D669,086 S | 10/2012 | Boyer et al. |
| D669,088 S | 10/2012 | Boyer et al. |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 8,477,175 B2 | 7/2013 | Shaffer et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0114392 A1* | 8/2002 | Sekiguchi et al. ....... 375/240.15 |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1* | 10/2003 | Hall et al. ................ 375/240.16 |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |

(56) References Cited

U.S. PATENT DOCUMENTS

| | | |
|---|---|---|
| 2007/0159523 A1 | 7/2007 | Hillis et al. |
| 2007/0183661 A1 | 8/2007 | El-Maleh et al. |
| 2007/0188597 A1 | 8/2007 | Kenoyer et al. |
| 2007/0189219 A1 | 8/2007 | Navali et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0051756 A1 | 2/2009 | Trachtenberg |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0316232 A1 | 12/2010 | Acero et al. |
| 2011/0008017 A1 | 1/2011 | Gausereide |
| 2011/0039506 A1 | 2/2011 | Lindahl et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0109642 A1 | 5/2011 | Chang et al. |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 22777308 | 1/2011 |
| GB | 2 294 605 A | 5/1996 |
| GB | 2336266 | 10/1999 |
| GB | 2 355 876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2005/031001 A3 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

U.S. Appl. No. 13/106,002, filed May 12, 2011, entitled "System and Method for Video Coding in a Dynamic Environment," Inventors: Dihong Tian et al.

U.S. Appl. No. 13/098,430, filed Apr. 30, 2011, entitled "System and Method for Transferring Transparency Information in a Video Environment," Inventors: Eddie Collins et al.

U.S. Appl. No. 13/096,795, filed Apr. 28, 2011, entitled "System and Method for Providing Enhanced Eye Gaze in a Video Conferencing Environment," Inventors: Charles C. Byers.

(56) References Cited

OTHER PUBLICATIONS

U.S. Appl. No. 13/298,022, filed Nov. 16, 2011, entitled "System and Method for Alerting a Participant in a Video Conference," Inventor(s): TiongHu Lian, et al.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
EPO Communication dated Feb. 25, 2011 for EP09725288.6 (published as EP22777308); 4 pages.
EPO Aug. 15, 2011 Response to EPO Communication mailed Feb. 25, 2011 from European Patent Application No. 09725288.6; 15 pages.
PCT Sep. 25, 2007 Notification of Transmittal of the International Search Report from PCT/US06/45895.
PCT Sep. 2, 2008 International Preliminary Report on Patentability (1 page) and the Written Opinion of the ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
Dornaika F., et al., ""Head and Facial Animation Tracking Using Appearance-Adaptive Models and Particle Filters,"" Jun. 27, 2004; 22 pages; Heudiasy Research Lab, http://eprints.pascal-network.org/archive/00001231/01/rtvhci_chapter8.pdf.
Hammadi, Nait Charif et al., ""Tracking the Activity of Participants in a Meeting,"" Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
Gemmell, Jim, et al., "Gaze Awareness for Video-conferencing: A Software Approach," IEEE MultiMedia, Oct.-Dec. 2000; vol. 7, No. 4, pp. 26-35.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD—DOI: 10.1109/GMAI.2006.34 Jul. 5, 2006, pp. 203-208; XP010927285 [Abstract Only].
Chien et al., "Efficient moving Object Segmentation Algorithm Using Background Registration Technique," IEEE Transactions on Circuits and Systems for Video Technology, vol. 12, No. 7, Jul. 2002, 10 pages.
Digital Video Enterprises, "DVE Eye Contact Silhouette," 1 page, © DVE 2008; http://www.dvetelepresence.com/products/eyeContactSilhouette.asp.
Jamoussi, Bamil, "Constraint-Based LSP Setup Using LDP," MPLS Working Group, Sep. 1999, 34 pages; http://tools.ietf.org/html/draft-ietf-mpls-cr-ldp-03.
Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.
Jong-Gook Ko et al., ""Facial Feature Tracking and Head Orientation-Based Gaze Tracking,"" ITC-CSCC 2000, International Technical Conference on Circuits/Systems, Jul. 11-13, 2000, 4 pages; http://www.umiacs.umd.edu/~knkim/paper/itc-cscc-2000-jgko.pdf.
Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.
Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.
Keijser, Jeroen, et al., "Exploring 3D Interaction in Alternate Control-Display Space Mappings," IEEE Symposium on 3D User Interfaces, Mar. 10-11, 2007, pp. 17-24.
Kim, Y.H., et al., "Adaptive mode decision for H.264 encoder," Electronics letters, vol. 40, Issue 19, pp. 1172-1173, Sep. 2004; 2 pages.
Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.
Kollarits, R.V., et al., "34.3: An Eye Contact Camera/Display System for Videophone Applications Using a Conventional Direct-View LCD," © 1995 SID, ISSN0097-0966X/95/2601, pp. 765-768 http://citeseerx.ist.psu.edu/viewdoc/download;jsessionid=47A1E7E028C26503975E633895D114EC?doi=10.1.1.42.1772&rep=rep1&type=pdf.
Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba721db14d26dfccc6b470f/1291487062/3143800.pdf.
Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.
Lambert, "Polycom Video Communications," © 2004 Polycom, Inc., Jun. 20, 2004 http://www.polycom.com/global/documents/whitepapers/video_communications_h.239_people_content_polycom_patented_technology.pdf.
Lawson, S., "Cisco Plans TelePresence Translation Next Year," Dec. 9, 2008; http://www.pcworld.com/article/155237/.html?tk=rss_news; 2 pages.
Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.
Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.
Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.
Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.
Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrl.
Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/ Publications/miller05cvmp.pdf, 10 pages.
Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

(56) References Cited

OTHER PUBLICATIONS

Minoru from Novo is the worlds first consumer 3D Webcam, Dec. 11, 2008; http://www.minoru3d.com; 4 pages.

Mitsubishi Electric Research Laboratories, copyright 2009 [retrieved and printed on Feb. 26, 2009], http://www.merl.com/projects/3dtv, 2 pages.

Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.

National Training Systems Association Home—Main, Interservice/Industry Training, Simulation & Education Conference, Dec. 1-4, 2008; http://ntsa.metapress.com/app/home/main.asp?referrer=default; 1 page.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.

OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.

OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html; 2 pages.

OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.

OptoIQ, "Vision Systems Design—Machine Vision and Image Processing Technology," [retrieved and printed on Mar. 18, 2010], http://www.optoiq.com/index/machine-vision-imaging-processing.html; 2 pages.

Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.

Radhika, N., et al., "Mobile Dynamic reconfigurable Context aware middleware for Adhoc smart spaces," vol. 22, 2008, http://www.acadjournal.com/2008/V22/part6/p7; 3 pages.

Rayvel Business-to-Business Products, copyright 2004 [retrieved and printed on Feb. 24, 2009], http://www.rayvel.com/b2b.html; 2 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

Rikert, T.D., et al., "Gaze Estimation using Morphable models," IEEE International Conference on Automatic Face and Gesture Recognition, Apr. 1998; 7 pgs. http://citeseer.ist.psu.edu/viewdoc/summary?doi=10.1.1.30.9472.

Robust Face Localisation Using Motion, Colour & Fusion; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.

U.S. Appl. No. 12/781,722, filed May 17, 2010, entitled "System and Method for Providing Retracting Optics in a Video Conferencing Environment," Inventor(s): Joseph T. Friel, et al.

U.S. Appl. No. 12/912,556, filed Oct. 26, 2010, entitled "System and Method for Provisioning Flows in a Mobile Network Environment," Inventors: Baiaji Vankat Vankataswami, et al.

U.S. Appl. No. 12/949,614, filed Nov. 18, 2010, entitled "System and Method for Managing Optics in a Video Environment," Inventors: Torence Lu, et al.

U.S. Appl. No. 12/946,679, filed Nov. 15, 2010, entitled "System and Method for Providing Camera Functions in a Video Environment," Inventors; Peter A.J. Fornell, et al.

U.S. Appl. No. 12/946,695, filed Nov. 15, 2010; entitled "System and Method for Providing Enhanced Audio in a Video Environment," Inventors; Wei Li, et al.

U.S. Appl. No. 12/950,786, filed Nov. 19, 2010, entitled "System and Method for Providing Enhanced Video Processing in a Network Environment," Inventor[s]: David J. Mackie.

U.S. Appl. No. 12/945,704, filed Nov. 15, 2010, entitled "System and Method for Providing Enhanced Graphics in a Video Environment," Inventors: John M. Kanalakis, Jr., et al.

U.S Appl. No. 12/957,116, filed Nov. 30, 2010, entitled "System and Method for Gesture Interface Control," Inventors: Shuan K. Kirby, et al.

U.S. Appl. No. 13/036,925, filed Feb. 28, 2011 ,entitled "System and Method for Selection of Video Data in a Video Conference Environment," Inventor(s) Sylvia Olayinka Aye Manfa N'guessan.

U.S. Appl. No. 12/939,037, filed Nov. 3, 2010, entitled "System and Method for Managing Flows in a Mobile Network Environment," Inventors: Balaji Venkat Venkataswami et al.

U.S. Appl. No. 12/946,709, filed Nov. 15, 2010, entitled "System and Method for Providing Enhanced Graphics in a Video Environment," Inventors: John M. Kanalakis, Jr.

Design U.S. Appl. No. 29/375,624, filed Sep. 24, 2010, entitled "Mounted Video Unit," Inventor(s): Ashok T. Desai et al.

Design U.S. Appl. No. 29/375,627, filed Sep. 24, 2010, entitled "Mounted Video Unit," Inventor(s): Ashok T. Desai et al.

Design U.S. Appl. No. 29/369,951, filed Sep. 15, 2010, entitled "Video Unit With Integrated Features," Inventor(s): Kyle A. Buzzard et al.

Design U.S. Appl. No. 29/375,458, filed Sep. 22, 2010, entitled "Video Unit With Integrated Features," Inventor(s): Kyle A. Buzzard et al.

Design U.S. Appl. No. 29/375,619, filed Sep. 24, 2010, entitled "Free-Standing Video Unit," Inventor(s): Ashok T. Desai et al.

Design U.S. Appl. No. 29/381,245, filed Dec. 16, 2010, entitled "Interface Element," Inventor(s): John M. Kanalakis, Jr., et al.

Design U.S. Appl. No. 29/381,250, filed Dec. 16, 2010, entitled "Interface Element," Inventor(s): John M. Kanalakis, Jr., et al.

Design U.S. Appl. No. 29/381,254, filed Dec. 16, 2010, entitled "Interface Element," Inventor(s): John M. Kanalakis, Jr., et al.

Design U.S. Appl. No. 29/381,256, filed Dec. 16, 2010, entitled "Interface Element," Inventor(s): John M. Kanalakis, Jr., et al.

(56) References Cited

OTHER PUBLICATIONS

Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
"3D Particles Experiments in AS3 and Flash CS3," [retrieved and printed on Mar. 18, 2010]; 2 pages; http://www.flashandmath.com/advanced/fourparticles/notes.html.
3G, "World's First 3G Video Conference Service with New TV Commercial," Apr. 28, 2005, 4 pages; http://www.3g.co.uk/PR/April2005/1383.htm.
"Eye Tracking," from Wikipedia, (printed on Aug. 31, 2011) 12 pages; http://en.wikipedia.org/wiki/Eye_tracker.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
"Vocative Case," from Wikipedia, [retrieved and printed on Mar. 3, 2011] 11 pages; http://en.wikipedia.org/wiki/Vocative_case.
"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.
"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.
"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.
"Simple Hand Gesture Recognition," video clip, YouTube, posted Aug. 25, 2008 by pooh8210, 1 page; http://www.youtube.com/watch?v=F8GVeV0dYLM&feature=related.
Active8-3D—Holographic Projection—3D Hologram Retail Display & Video Project, [retrieved and printed on Feb. 24, 2009], http://www.activ8-3d.co.uk/3d_holocubes; 1 page.
"Andreopoulos, Yiannis, et al., ""In-Band Motion Compensated Temporal Filtering,"" Signal Processing: Image Communication 19 (2004) 653-673, 21 pages http://medianetlab.ee.ucla.edu/papers/011.pdf".
"Arulampalam, M. Sanjeev, et al., ""A Tutorial on Particle Filters for Online Nonlinear/Non-Gaussian Bayesian Tracking,"" IEEE Transactions on Signal Processing, vol. 50, No. 2, Feb. 2002, 15 pages http://www.cs.ubc.ca/~murphyk/Software/Kalman/ParticleFilterTutorial.pdf".
Awduche, D., et al., "Requirements for Traffic Engineering over MPLS," Network Working Group, RFC 2702, Sep. 1999, 30 pages; http://tools.ietf.org/pdf/rfc2702.pdf.
Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.
Boros, S., "Policy-Based Network Management with SNMP," Proceedings of the EUNICE 2000 Summer School Sep. 13-15, 2000, p. 3.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
Eisert, Peter, ""Immersive 3-D Video Conferencing: Challenges, Concepts and Implementations,"" Proceedings of SPIE Visual Communications and Image Processing (VCIP), Lugano, Switzerland, Jul. 2003; 11 pages; http://iphome.hhi.de/eisert/papers/vcip03.pdf.
Garg, Ashutosh, et al., ""Audio-Visual ISpeaker Detection Using Dynamic Bayesian Networks,"" IEEE International Conference on Automatic Face and Gesture Recognition, 2000 Proceedings, 7 pages; http://www.ifp.illinois.edu/~ashutosh/papers/FG00.pdf.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Gluckman, Joshua, et al., "Rectified Catadioptric Stereo Sensors," 8 pages, retrieved and printed on May 17, 2010; http://cis.poly.edu/~gluckman/papers/cvpr00.pdf.
Gundavelli, S., et al., "Proxy Mobile IPv6," Network Working Group, RFC 5213, Aug. 2008, 93 pages; http://tools.ietf.org/pdf/rfc5213.pdf.
Gussenhoven, Carlos, "Chapter 5 Transcription of Dutch Intonation," Nov. 9, 2003, 33 pages; http://www.ru.nl/publish/pages/516003/todisun-ah.pdf.
Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.
Hepper, D., "Efficiency Analysis and Application of Uncovered Background Prediction in a Low BitRate Image Coder," IEEE Transactions on Communications, vol. 38, No. 9, pp. 1578-1584, Sep. 1990.
Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.
U.S. Appl. No. 12/234,291, filed Sep. 19, 2008, entitled "System and Method for Enabling Communication Sessions in a Network Environment," Inventors: Yifan Gao et al.
U.S. Appl. No. 12/366,593, filed Feb. 5, 2009, entitled "System and Method for Depth Perspective Image Rendering," Inventors: J. William Mauchly et al.
U.S. Appl. No. 12/475,075, filed May 29, 2009, entitled "System and Method for Extending Communications Between Participants in a Conferencing Environment," Inventors: Brian J. Baldino et al.
U.S. Appl. No. 12/400,540, filed Mar. 9, 2009, entitled "System and Method for Providing Three Dimensional Video Conferencing in a Network Environment," Inventors: Karthik Dakshinamoorthy et al.
U.S. Appl. No. 12/400,582, filed Mar. 9, 2009, entitled "System and Method for Providing Three Dimensional Imaging in a Network Environment," Inventors: Shmuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, filed May 11, 2009, entitled "System and Method for Translating Communications Between Participants in a Conferencing Environment," Inventors: Marthinus F. De Beer et al.
U.S. Appl. No. 12/727,089, filed Mar. 18, 2010, entitled "System and Method for Enhancing Video Images in a Conferencing Environment," Inventor: Joseph T. Friel.
U.S. Appl. No. 12/784,257, filed May 20, 2010, entitled "Implementing Selective Image Enhancement," Inventors: Dihong Tian et al.
U.S. Appl. No. 12/870,687, filed Aug. 27, 2010, entitled "System and Method for Producing a Performance Via Video Conferencing in a Network Environment," Inventors: Michael A. Arnao et al.
U.S. Appl. No. 12/873,100, filed Aug. 31, 2010, entitled "System and Method for Providing Depth Adaptive Video Conferencing," Inventors: J. William Mauchly et al.

(56) References Cited

OTHER PUBLICATIONS

PCT "International Search Report and the Written Opinion of the International Searching Authority, or the Declaration," PCT/US2010/026456, dated Jun. 29, 2010, 11 pages.

PCT "Notification of Transmittal of the International Search Report and the Written Opinion of the International Searching Authority, or the Declaration," PCT/US2009/001070, dated Apr. 4, 2009, 14 pages.

PCT "Notification of Transmittal of the International Search Report and the Written Opinion of the International Searching Authority, or the Declaration," PCT/US2009/038310; dated Oct. 10, 2009; 17 pages.

PCT "International Preliminary Report on Patentability dated Sep. 29, 2009, International Search Report, and Written Opinion," for PCT International Application PCT/US2008/058079; dated Sep. 18, 2008, 10 pages.

U.S. Appl. No. 12/907,914, filed Oct. 19, 2010, entitled "System and Method for Providing Videomail in a Network Engironment," Inventor[s]: David J. Mackie et al.

U.S. Appl. No. 12/907,919, filed Oct. 19, 2010, entitled "System and Method for Providing Connectivity in a Network Environment," Inventor[s]: David J. Mackie et al.

U.S. Appl. No. 12/907,927, filed Oct. 19, 210, entitled "System and Method for Providing a Paring Mechanism in a Video Environment," Inventor[s]: Gangfeng Kong et al.

Andersson, L., et al., "LDP Sepcification," Network Working Group, RFC 3036, Jan. 2001, 133 pages; http://tools.ietf.org/html/rfc3036.

Arrington, Michael, "eJamming—Distributed Jamming," TechCrunch; Mar. 16, 2006; http://www.techcrunch.com/2006/03/16/ejamming-distributed-jamming/; 1 page.

Avrithis, Y., et al., "Color-Based Retrieval of Facial Images," European Signal Processing Conference (EUSIPCO'00), Tampere, Finland; Sep. 2000; http://www.image.ece.ntua.gr/~ntsap/presentations/eusipco00.ppt#256; 18 pages.

Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.

Boccaccio, Jeff; CEPro, "Inside HDMI CEC; The Little-Known Control Feature," Dec. 28, 2007; http://www.cepro.com/article/print/inside_hdmi_cec_the_little_known_control_feature; 2 pages.

Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24.

Chan, Eric, et al., "Experiments on block-matching techniques for video coding," Multimedia Systems; 9 Springer-Verlag 1994, Multimedia Systems (1994) 2 pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.0.1.35.1287.

Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.

"Cisco Expo Germany 2009 Opening," Posted on YouTube on May 4, 2009; http://www.youtube.com/watch?v=SDKsaSlz4MK; 2 pages.

Cisco: Bill Mauchly and Mod Marathe; UNC: Henry Fuchs, et al., "Depth-Dependent Perspective Rendering," Apr. 15, 2008; 6 pages.

Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.

Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.

Daly,S., et al., "Face-based visually-optimized image sequence coding," Image Processing, 1998, ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.

Diaz Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.

Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1page.

DVE Digital Video Enterprises, "DVE Tele-Immersion Room," [retrieved and printed on Feb. 5, 2009] http://www.dvetelepresence.com/products/immersion_room.asp; 2 pages.

"Dynamic Displays," copyright 2005-2008 [retrieved and printed on Feb. 24, 2009] http://www.zebraimaging.com/html/lighting_display.html, 2 pages.

ECmag.com, "IBS Products," Published Apr. 2009; http://www.ecmag.com/index.cfm?fa=article&articleID=10065; 2 pages.

EJamming Audio, Learn More; [retrieved and printed on May 27, 2010] http://www.ejamming.com/learnmore/; 4 pages.

Electrophysics Glossary, "Infrared Cameras, Thermal imaging, Night Vision Roof Moisture Detection," [retrieved and printed on Mar. 18, 2010] http://www.electrophysics.com/Browse/Brw_Glossary.asp; 11 pages.

Farrukh, A., et al., Automated Segmentation of Skin-Tone Regions in Video Sequences, Proceedings IEEE Students Conference, ISCON_apos_02; Aug. 16-17, 2002; pp. 122-128.

Fiala, Mark, "Automatic Projector Calibration Using Self-Identifying Patterns," National Research Council of Canada, Jun. 20-26, 2005; http://www.procams.org/ procams2005/papers/procams05-36.pdf; 6 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

"France Telecom's Magic Telepresence Wall," Jul. 11, 2006; http://www.humanproductivitylab.com/archive_blogs/2006/07/11/france_telecoms_magic_telepres_1,php; 4 pages.

Freeman, Professor Wilson T., Computer Vision Lecture Slides, "6.869 Advances in Computer Vision: Learning and Interfaces," Spring 2005; 21 pages.

Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.

Gries, Dan, "3D Particles Experiments in A53 and Flash C53, Dan's Comments," [retrieved and printed on May 24, 2010] http://www.flashandmath.com/advanced/fourparticles/notes.html; 3 pages.

Guernsey, Lisa, "Toward Better Communication Across the Language Barrier," Jul. 29, 1999; http://www.nytimes.com/1999/07/29/technology/toward-better-communication-across-the-language-barrier.html; 2 pages.

Guili, D., et al., "Orchestral: A Distributed Platform for Virtual Musical Groups and Music Distance Learning over the Internet in JavaTM Technology"; [retrieved and printed on Jun. 6, 2010] http://ieeexplore.ieee.org/stamp/stamp.jsp?tp=&arnumber=778626; 2 pages.

Habili, Nariman, et al., "Segmentation of the Face and Hands in Sign Language Video Sequences Using Color and Motion Cues" IEEE

(56) References Cited

OTHER PUBLICATIONS

Transaction on Circuits and Systems for Video Technology, IEEE Service Center, vol. 14, No. 8, Aug. 1, 2004; ISSN: 1051-8215; XP011115755; pp. 1086-1097.
He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.
Holographic Imaging, "Dynamic Holography for scientific uses, military heads up display and even someday HoloTV using TI's DMD," [retrieved and printed on Feb. 26, 2009] http://innovation.swmed.edu/research/instrumentation/res_inst_dev3d.html; 5 pages.
Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.
Infrared Cameras TVS-200-EX, [retrieved and printed on May 24, 2010] http://www.electrophysics.com/Browse/Brw_ProductLineCategory.asp?CategoryID=184&Area=IS; 2 pages.
IR Distribution Category @ Envious Technology, "IR Distribution Category," [retrieved and printed on Apr. 22, 2009] http://www.envioustechnology.com.au/ products/product-list.php?CID=305; 2 pages.
IR Trans—Products and Orders—Ethernet Devices, [retrieved and printed on Apr. 22, 2009] http://www.irtrans.de/en/shop/lan.php; 2 pages.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.
Itoh, Hiroyasu, et al., "Use of a gain modulating framing camera for time-resolved imaging of cellular phenomena," SPIE vol. 2979, 1997, pp. 733-740.
Jiang, Minqing, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.
Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.
Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.
PCT May 30, 2013 International Preliminary Report on Patentability and Written Opinion from the International Searching Authority for International Application Serial No. PCT/US2011/061442 8 pages.
PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
PRC Jun. 18, 2013 Response to SIPO Second Office Action from Chinese Application No. 200980119121.5; 5 pages.
EPO Jul. 10, 2012 Response to EP Communication from European Application EP10723445.2.
EPO Sep. 24, 2012 Response to Mar. 20, 2012 EP Communication from European Application EP09725288.6.
PCT Oct. 7, 2010 PCT International Preliminary Report on Patentability mailed Oct. 7, 2010 for PCT/US2009/038310; 10 pages.
PCT Feb. 23, 2010 PCT Notification of Transmittal of the International Search Report and the Written Opinion of the International Searching Authority, or the Declaration for PCT/US2009/064061 mailed Feb. 23, 2010; 14 pages.
PCT Aug. 26, 2010 International Preliminary Report on Patentability mailed Aug. 26, 2010 for PCT/US2009/001070; 10 pages.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
PCT Mar. 21, 2013 International Preliminary Report on Patentability from International Application Serial No. PCT/US2011/050380.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
School of Computing, "Bluetooth over IP for Mobile Phones," 2005; http://www.computing.dcu.ie/wwwadmin/fyp-abstract/list/fyp_details05.jsp?year=2005&number=51470574; 1 page.
Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.
SENA, "Industrial Bluetooth," [retrieved and printed on Apr. 22, 2009] http://www.sena.com/products/industrial_bluetooth; 1 page.
Shaffer, Shmuel, "Translation—State of the Art" presentation; Jan. 15, 2009; 22 pages.
Shi, C. et al., "Automatic Image Quality Improvement for Videoconferencing," IEEE ICASSP May 2004; http://research.microsoft.com/pubs/69079/0300701.pdf; 4 pages.
Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.
SMARTHOME, "IR Extender Expands Your IR Capabilities," [retrieved and printed on Apr. 22, 2009], http://www.smarthome.com/8121.html; 3 pages.
Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.
Sonoma Wireworks Forums, "Jammin on Rifflink," [retrieved and printed on May 27, 2010] http://www.sonomawireworks.com/forums/viewtopic.php?id=2659; 5 pages.
Sonoma Wireworks Rifflink, [retrieved and printed on Jun. 2, 2010] http://www.sonomawireworks.com/rifflink.php; 3 pages.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN: 0277-786X; XP007905596; pp. 78-88.
Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.
Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.
Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
Super Home Inspectors or Super Inspectors, [retrieved and printed on Mar. 18, 2010] http://www.umrt.com/PageManager/Default.aspx/PageID=2120325; 3 pages.
Tan, Kar-Han, et al., "Appearance-Based Eye Gaze Estimation," In Proceedings IEEE WACV'02, 2002, 5 pages; http://citeseer.ist.psu.edu/viewdoc/summary?doi=10.1.1.19.8921.
Total immersion, Video Gallery, copyright 2008-2009 [retrieved and printed on Feb. 26, 2009], http://www.t-immersion.com/en,videogallery,36.html, 1 page.

(56) References Cited

OTHER PUBLICATIONS

Trevor Darrell, "A Real-Time Virtual Mirror Display," 1 page, Sep. 9, 1998; http://people.csail.mit.edu/trevor/papers/1998-021/node6.html.

Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.

Tsapatsoulis, N., et al., "Face Detection for Multimedia Applications," Proceedings of the ICIP Sep. 10-13, 2000, Vancouver, BC, Canada; vol. 2, pp. 247-250.

Tsapatsoulis, N., et al., "Face Detection in Color Images and Video Sequences," 10th Mediterranean Electrotechnical Conference (MELECON), May 29-31, 2000; vol. 2; pp. 498-502.

Veratech Corp., "Phantom Sentinel," © VeratechAero 2006, 1 page; http://www.veratechcorp.com/phantom.html.

Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.

Wachs, J., et al., "A Real-time Hand Gesture System Based on Evolutionary Search," Vision, 3rd Quarter 2006, vol. 22, No. 3, 18 pages; http://web.ics.purdue.edu/~jpwachs/papers/3q06vi.pdf.

Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.

Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.

Wang, Robert and Jovan Popovic, "Desktop virtual reality," video clip, YouTube, posted by rkeltset on Apr. 8, 2010, 1 page; http://www.youtube.com/watch?v=9rBtm62Lkfk.

Wang, Robert and Jovan Popovic, "Gestural user input," video clip, YouTube, posted by rkeltset on May 19, 2010, 1 page; http://www.youtube.com/watch?v=3JWYTtBjdTE.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.

Weinstein et al., "Emerging Technologies for Teleconferencing and Telepresence," Wainhouse Research 2005; http://www.ivci.com/pdf/whitepaper-emerging-technologies-for-teleconferencing-and-telepresence.pdf.

Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

Wi-Fi Protected Setup, from Wikipedia, Sep. 2, 2010, 3 pages http://en.wikipedia.org/wiki/Wi-Fi_Protected_Setup.

Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.

WirelessDevNet, Melody Launches Bluetooth Over IP, [retrieved and printed on Jun. 5, 2010] http://www.wirelessdevnet.com/news/2001/155/news5.html; 2 pages.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.

Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.

Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pages.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Yoo, Byounghun, et al., "Image-Based Modeling of Urban Buildings Using Aerial Photographs and Digital Maps," Transactions in GIS, 2006, 10(3): p. 377-394.

Zhong, Ren, et al., "Integration of Mobile IP and MPLS," Network Working Group, Jul. 2000, 15 pages; http://tools.ietf.org/html/draft-zhong-mobile-ip-mpls-01.

PRC Aug. 3, 2012 SIPO First Office Action from Chinese Application No. 200980119121.5; 16 pages.

PRC Dec. 18, 2012 Response to SIPO First Office Action from Chinese Application No. 200980119121.5; 16 pages.

PRC Jan. 7, 2013 SIPO Second Office Action from Chinese Application Serial No. 200980105262.1.

PRC Apr. 3, 2013 SIPO Second Office Action from Chinese Application No. 200980119121.5; 16 pages.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/0BS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0B22LFIS1NVyrOmR.html.

Video on TED.com, Pranav Mistry: the Thrilling Potential of SixthSense Technology (5 pages) and Interactive Transcript (5 pgs.), retrieved and printed on Nov. 30, 2010; http://www.ted.com/talks/pranav_mistry_the_thrilling_potential_of_sixthsense_technology.html.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

(56) References Cited

OTHER PUBLICATIONS

Kramer, Kwindla, "Oblong on Bloomberg TV," Oblong Industries, Inc. Web Log, Jan. 28, 2010, 1 page; http://oblong.com/article/OAN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, Inc. Web Log, Mar. 24, 2009, 1 page; http://oblong.com/article/08mM77zpYMm7kFtv.html.

"g-stalt version 1," video clip, YouTube.com, posted by zigg1es on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB4I1Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages,http://oblong.com/article/084H-PKI5Tb9I4Ti.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAf9.html.

PRC Jul. 9, 2013 SIPO Third Office Action from Chinese Application No. 200980119121.5; 15 pages.

PRC Sep. 24, 2013 Response to SIPO Third Office Action from Chinese Application No. 200980119121.5; 5 pages.

* cited by examiner

SYSTEM AND METHOD FOR SKIP CODING DURING VIDEO CONFERENCING IN A NETWORK ENVIRONMENT

TECHNICAL FIELD

This disclosure relates in general to the field of video and, more particularly, to skip coding during video conferencing in a network environment.

BACKGROUND

Skip coding is an efficient protocol for inter-frame video coding, where a macroblock is indicated to a video decoder as skipped. The decoding of such a macroblock involves copying the decoded data in the same position from a reference picture. Skip coding is especially valuable in video conferencing situations, where the background often remains stationary and varies infrequently. Determining whether a macroblock may be coded as skipped is typically an encoder task. Decisions based on frame difference metrics suffer from temporal noise in the video frames. This can be attributed to image sensors, where the temporal noise can become significant with consumer-grade cameras, when lighting conditions are poor, etc. Temporal noise reduction is either unavailable or expensive to obtain in many of today's video environments. Hence, skip coding can lose its efficacy because a large number of stationary video blocks have to be coded due to temporal noise. The ability to properly coordinate video data in such environments present a significant challenge to equipment vendors, service providers, and network operators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving an input video, and identifying values of pixels from noise associated with a current video image within the video input. The method also includes creating a skip-reference video image associated with the identified pixel values, and comparing a portion of the current video image to the skip-reference video image. The method also includes determining a macroblock associated with the current video image to be skipped before an encoding operation occurs. The method can also include encoding non-skipped macroblocks associated with the current video image based on a noise level being above a designated noise threshold. The identifying can further include generating a plurality of histograms to represent variation statistics between a current input video frame and a temporally preceding video frame.

In certain implementations, each of the histograms includes differing levels of luminance within the input video. If a selected one of the histograms reaches a certain level of luminance, a corresponding pixel of an associated video image is marked to be registered to a reference buffer. In more specific examples, the method may include aggregating non-skipped macroblocks and the skipped macroblock associated with the current video image, and subsequently communicating the macroblocks over a network connection to an endpoint associated with a video conference. The comparing of the portion of the current video image to the skip reference video image can be performed in a single reference buffer, or in multiple reference buffers.

Example Embodiments

Figure 1:
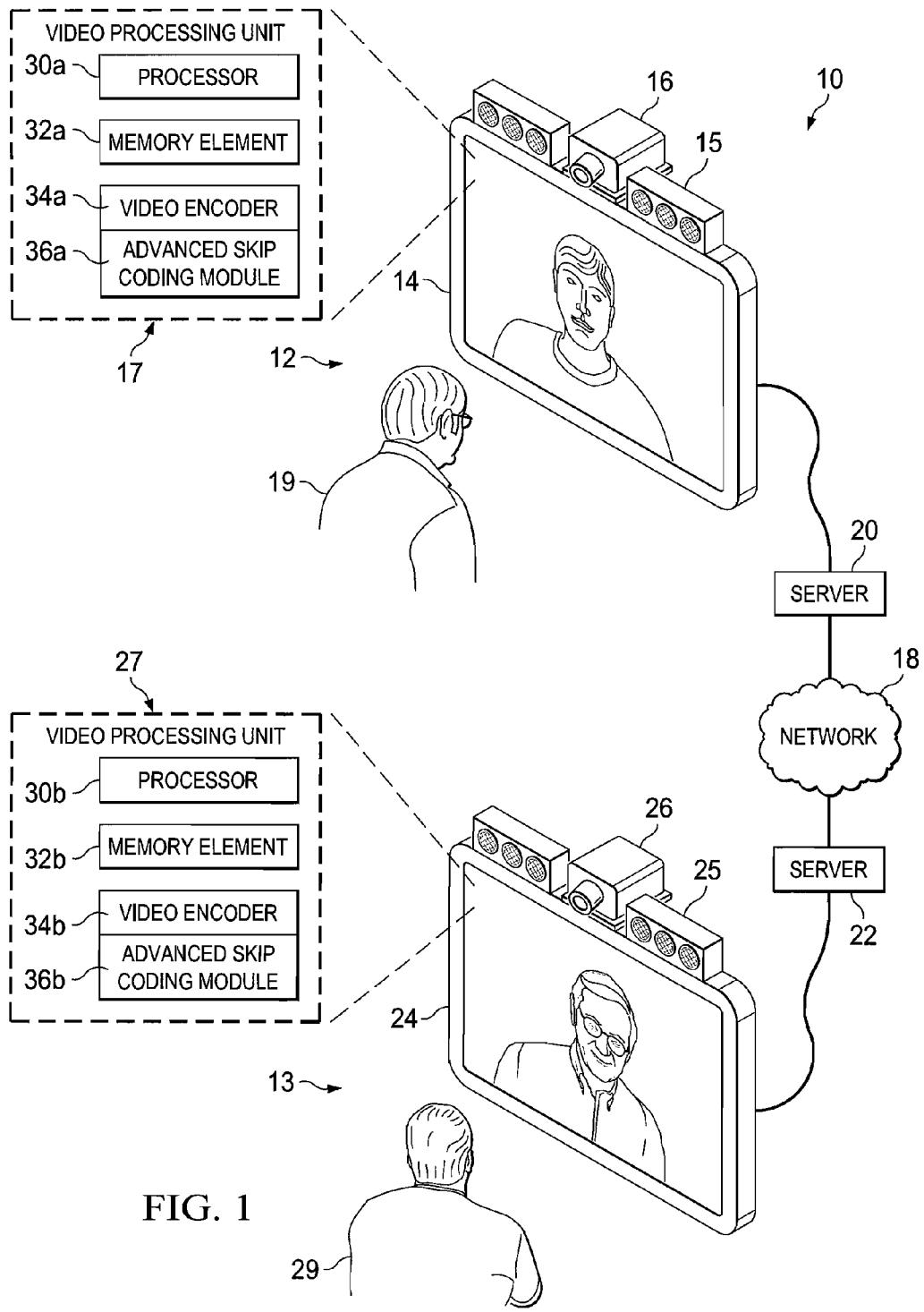
FIG. 1 is a simplified schematic diagram illustrating a system for video conferencing in accordance with one embodiment of the present disclosure.

Turning to FIG. 1, FIG. 1 is a simplified schematic diagram illustrating a system 10 for video conferencing activities in accordance with one embodiment of the present disclosure. In this particular implementation, system 10 is representative of an architecture for facilitating a video conference over a network utilizing advanced skip-coding protocols (or any suitable variation thereof). System 10 includes two distinct communication systems that are represented as endpoints 12 and 13, which are provisioned in different geographic locations. Endpoint 12 may include a display 14, a plurality of speakers 15, a camera 16, and a video processing unit 17. In this embodiment, video processing unit 17 is integrated into display 14; however, video processing unit 17 could readily be a stand-alone unit as well.

Endpoint 13 may similarly include a display 24, a plurality of speakers 25, a camera 26, and a video processing unit 27. Additionally, endpoints 12 and 13 may be coupled to a server 20, 22 respectively, where the endpoints are connected to each other via a network 18. Each video processing unit 17, 27 may further include a respective processor 30a, 30b, a respective memory element 32a, 32b, a respective video encoder 34a, 34b, and a respective advanced skip coding module 36a. The function and operation of these elements is discussed in detail below. In the context of a conference involving a participant 19 (present at endpoint 12) and a participant 29 (present at endpoint 13), packet information may propagate over network 18 during the conference. As each participant 19 and 29 communicates, cameras 16, 26 suitably capture video images as data. Each video processing unit 17, 27 evaluates this video data and then determines which data to send to the other location for rendering on displays 14, 24.

Note that for purposes of illustrating certain example techniques of system 10, it is important to understand the data issues present in many video applications. The following foundational information may be viewed as a basis from which the present disclosure may be properly explained. Video processing units can be configured to skip macroblocks of a video signal during encoding of a video sequence. This means that no coded data would be transmitted for these macroblocks. This can include codecs (e.g., MPEG-4, H.263, etc.) for which bandwidth and network congestion present significant concerns. Additionally, for mobile video-telephony and for computer-based conferencing, processing resources are at a premium. This includes personal computer (PC) applications, as well as more robust systems for video conferencing (e.g., Telepresence).

Coding performance is often constrained by computational complexity. Computational complexity can be reduced by not processing macroblocks of video data (e.g., prior to encoding) when they are expected to be skipped. Skipping macroblocks saves significant computational resources because the subsequent processing of the macroblock (e.g., motion estimation, transform and quantization, entropy encoding, etc.) can be avoided. Some software video applications control processor utilization by dropping frames during encoding activities: often resulting in a jerky motion in the decoded video sequence. Distortion is also prevalent when macroblocks are haphazardly (or incorrectly) skipped. It is important to reduce computational complexity and to manage bandwidth, while simultaneously delivering a video signal that is adequate for the participating viewer (i.e., the video signal has no discernible deterioration, distortion, etc.).

In accordance with the teachings of the present disclosure, system 10 employs an advanced skip coding (ASC) methodology that effectively addresses the aforementioned issues. In particular, the protocol can include three significant components that can collectively address problems presented by temporal video noise. First, system 10 can efficiently represent the variation statistics of the temporally preceding frames. Second, system 10 can identify the most likely "skipable" values of each picture element. Third, system 10 can determine whether the current encoded picture element should be coded as skip, in conjunction with being provided with the reference picture. Each of these components is further discussed in detail below.

Operating together, these coding components can be configured to determine which new data should be encoded and sent to the other counterparty endpoint and, further, which data (having already been captured and encoded) can be used as reference data. By minimizing the amount of new data that is to be encoded, the architecture can minimize processing power and bandwidth consumption in the network between endpoints 12, 13. Before detailing additional operations associated with the present disclosure, some preliminary information is provided about the corresponding infrastructure of FIG. 1.

Displays 14, 24 are screens at which video data can be rendered for one or more end users. Note that as used herein in this Specification, the term 'display' is meant to connote any element that is capable of delivering image data (inclusive of video information), text, sound, audiovisual data, etc. to an end user. This would necessarily be inclusive of any panel, plasma element, television, display, computer interface, screen, Telepresence devices (inclusive of Telepresence boards, panels, screens, walls, surfaces, etc.) or any other suitable element that is capable of delivering, rendering, or projecting such information.

Speakers 15, 25 and cameras 16, 26 are generally mounted around respective displays 14, 24. Cameras 16, 26 can be wireless cameras, high-definition cameras, or any other suitable camera device configured to capture image data. Similarly, any suitable audio reception mechanism can be provided to capture audio data at each location. In terms of their physical deployment, in one particular implementation, cameras 16, 26 are digital cameras, which are mounted on the top (and at the center of) displays 14, 24. One camera can be mounted on each respective display 14, 24. Other camera arrangements and camera positioning is certainly within the broad scope of the present disclosure.

A respective participant 19 and 29 may reside at each location for which a respective endpoint 12, 13 is provisioned. Endpoints 12 and 13 are representative of devices that can be used to facilitate data propagation. In one particular example, endpoints 12 and 13 are representative of video conferencing endpoints, which can be used by individuals for virtually any communication purpose. It should be noted however that the broad term 'endpoint' can be inclusive of devices used to initiate a communication, such as any type of computer, a personal digital assistant (PDA), a laptop or electronic notebook, a cellular telephone, an iPhone, an IP phone, an iPad, a Google Droid, or any other device, component, element, or object capable of initiating or facilitating voice, audio, video, media, or data exchanges within system 10. Hence, video processing unit 17 can be readily provisioned in any such endpoint. Endpoints 12 and 13 may also be inclusive of a suitable interface to the human user, such as a microphone, a display, or a keyboard or other terminal equipment. Endpoints 12 and 13 may also be any device that seeks to initiate a communication on behalf of another entity or element, such as a program, a database, or any other component, device, element, or object capable of initiating an exchange within system 10. Data, as used herein in this document, refers to any type of numeric, voice, video, media, or script data, or any type of source or object code, or any other suitable information in any appropriate format that may be communicated from one point to another.

Each endpoint 12, 13 can also be configured to include a receiving module, a transmitting module, a processor, a memory, a network interface, a call initiation and acceptance facility such as a dial pad, one or more speakers, one or more displays, etc. Any one or more of these items may be consolidated, combined, or eliminated entirely, or varied considerably, where those modifications may be made based on particular communication needs.

Note that in one example, each endpoint 12, 13 can have internal structures (e.g., a processor, a memory element, etc.) to facilitate the operations described herein. In other embodiments, these audio and/or video features may be provided externally to these elements or included in some other proprietary device to achieve their intended functionality. In still other embodiments, each endpoint 12, 13 may include any suitable algorithms, hardware, software, components, modules, interfaces, or objects that facilitate the operations thereof.

Network 18 represents a series of points or nodes of interconnected communication paths for receiving and transmitting packets of information that propagate through system 10. Network 18 offers a communicative interface between any of the nodes of FIG. 1, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. Note that in using network 18, system 10 may include a configuration capable of transmission control protocol/internet protocol (TCP/IP) communications for the transmission and/or reception of packets in a network. System 10 may also operate in conjunction with a user datagram protocol/IP (UDP/IP) or any other suitable protocol, where appropriate and based on particular needs.

Each video processing unit 17, 27 is configured to evaluate video data and make determinations as to which data should be rendered, coded, skipped, manipulated, analyzed, or otherwise processed within system 10. As used herein in this Specification, the term 'video element' is meant to encompass any suitable unit, module, software, hardware, server, program, application, application program interface (API), proxy, processor, field programmable gate array (FPGA), erasable programmable read only memory (EPROM), electrically erasable programmable ROM (EEPROM), application specific integrated circuit (ASIC), digital signal processor (DSP), or any other suitable device, component, element, or object configured to process video data. This video element may include any suitable hardware, software, components, modules, interfaces, or objects that facilitate the operations thereof. This may be inclusive of appropriate algorithms and communication protocols that allow for the effective exchange (reception and/or transmission) of data or information.

Note that each video processing unit 17, 27 may share (or coordinate) certain processing operations (e.g., with respective endpoints 12, 13). Using a similar rationale, their respective memory elements may store, maintain, and/or update data in any number of possible manners. Additionally, because some of these video elements can be readily combined into a single unit, device, or server (or certain aspects of these elements can be provided within each other), some of the illustrated processors may be removed, or otherwise consolidated such that a single processor and/or a single memory location could be responsible for certain activities associated with skip coding controls. In a general sense, the arrangement depicted in FIG. 1 may be more logical in its representations, whereas a physical architecture may include various permutations/combinations/hybrids of these elements.

In one example implementation, video processing units 17, 27 include software (e.g., as part of advanced skip coding modules 36a-b respectively) to achieve the intelligent skip coding operations, as outlined herein in this document. In other embodiments, this feature may be provided externally to any of the aforementioned elements, or included in some other video element or endpoint (either of which may be proprietary) to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these skip coding management operations, as disclosed herein.

Integrated video processing unit 17 is configured to receive information from camera 16 via some connection, which may attach to an integrated device (e.g., a set-top box, a proprietary box, etc.) that can sit atop a display. Video processing unit 17 may also be configured to control compression activities, or additional processing associated with data received from the cameras. Alternatively, a physically separate device can perform this additional processing before image data is sent to its next intended destination. Video processing unit 17 can also be configured to store, aggregate, process, export, and/or otherwise maintain image data and logs in any appropriate format, where these activities can involve processor 30a and memory element 32a. In certain example implementations, video processing units 17 and 27 are part of set-top box configurations. In other instances, video processing units 17, 27 are part of a server (e.g., servers 20 and 22). In yet other examples, video processing units 17, 27 are network elements that facilitate a data flow with their respective counterparty. As used herein in this Specification, the term 'network element' is meant to encompass routers, switches, gateways, bridges, loadbalancers, firewalls, servers, processors, modules, or any other suitable device, component, element, or object operable to exchange information in a network environment. This includes proprietary elements equally, which can be provisioned with particular features to satisfy a unique scenario or a distinct environment.

Video processing unit 17 may interface with camera 16 through a wireless connection, or via one or more cables or wires that allow for the propagation of signals between these two elements. These devices can also receive signals from an intermediary device, a remote control, etc., where the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between video processing unit 17 and camera 16. Transmissions between these two sets of devices can be bidirectional in certain embodiments such that the devices can interact with each other (e.g., dynamically, real-time, etc.). This would allow the devices to acknowledge transmissions from each other and offer feedback, where appropriate. Any of these devices can be consolidated with each other, or operate independently based on particular configuration needs. For example, a single box may encompass audio and video reception capabilities (e.g., a set-top box that includes video processing unit 17, along with camera and microphone components for capturing video and audio data).

Figure 2:
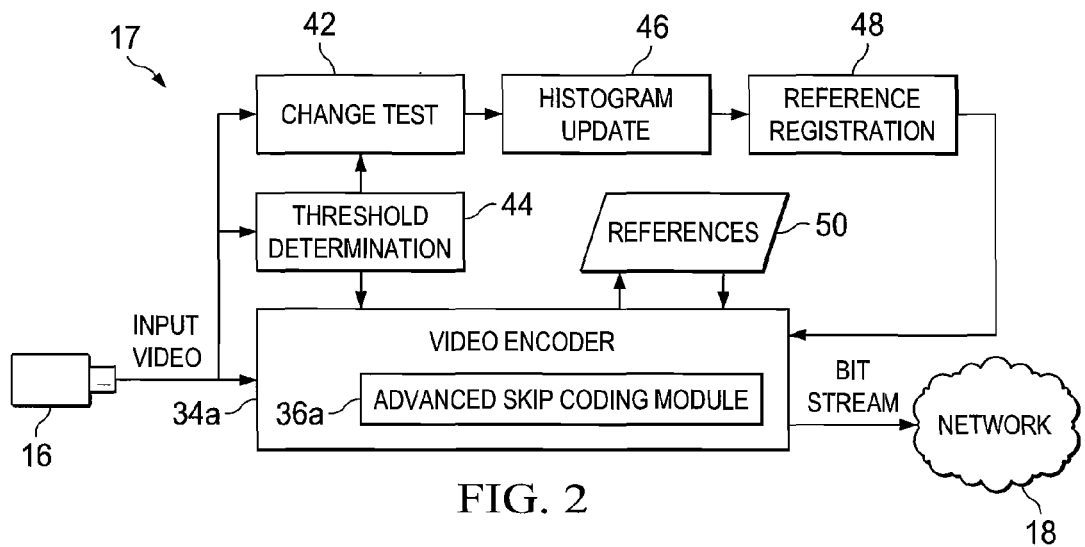
FIG. 2 is a simplified block diagram illustrating an example flow of data within an endpoint in accordance with one embodiment of the present disclosure.

Turning to FIG. 2, FIG. 2 is a simplified block diagram illustrating an example flow of data within a single endpoint in accordance with one embodiment of the present disclosure. In this particular implementation, camera 16 and video processing unit 17 are being depicted. Video processing unit 17 includes a change test 42, a threshold determination 44, a histogram update 46, a reference registration 48, and a reference 50. Video processing unit 17 may also include the aforementioned video encoder 34a and advanced skip coding module 36a.

In operational terms, camera 16 can capture the input video associated with participant 19. This data can flow from camera 16 to video processing unit 17. The data flow can be directed to video encoder 34a (which can include advanced skip coding module 36a) and subsequently propagate to threshold determination 44 and to change test 42. The data can be analyzed as a series of still images or frames, which are temporally displaced from each other. These images are analyzed by threshold determination 44 and change test 42, as detailed below.

Figure 3:
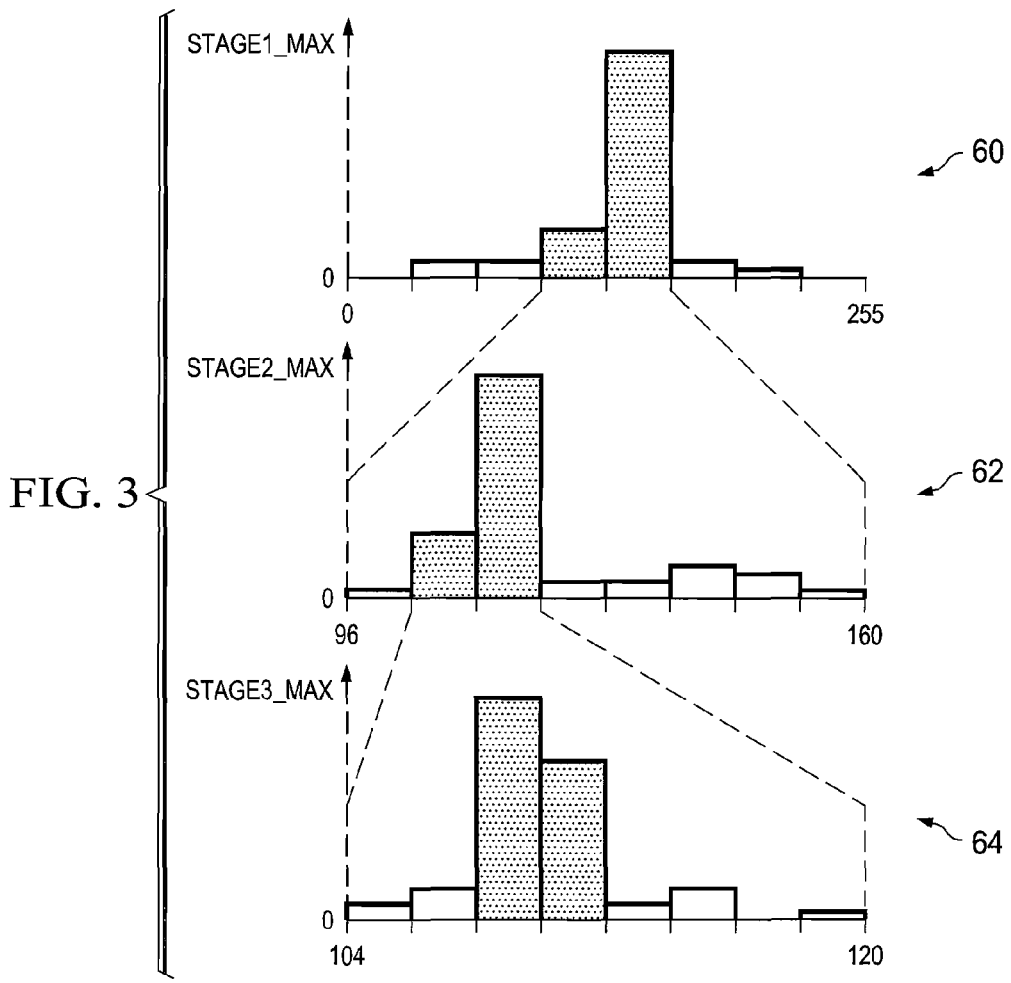
FIG. 3 is a simplified diagram showing a multi-stage histogram in accordance with one embodiment of the present disclosure.

Referring now to FIG. 3, FIG. 3 is a simplified diagram showing a multi-stage histogram in accordance with one embodiment of the present disclosure. This particular activity can take place within threshold determination 44 and change test 42. In this embodiment, the data is analyzed in multi-stage histograms to represent the variation statistics of every two consecutive frames. It should be noted that this concept is based on the inherent knowledge that typical videoconferencing scenes (e.g., Telepresence scenes) do not change frequently and/or significantly. Each histogram can record the variation statistics of one picture element (i.e., a video image). A picture element can be considered to be one pixel in the original image, or a resolution-reduced (downscaled) image. Pixels can be combined to form macroblocks of the image, and the image can be grouped into a 16×16 macroblock grid in this particular example. Other groupings can readily be used, where such groupings or histogram configurations may be based on particular needs.

In this embodiment, the multi-stage histogram has three stages 60, 62, 64. Each stage contains 8 bins in this example. First stage histogram 60 divides the 256 luminance levels into 8 bins: each bin corresponding to 32 luminance levels (256/8=32). Second stage histogram 62 corresponds to the best two adjacent bins of the first-stage histogram and, further, divides the corresponding 64 luminance levels into 8 bins (i.e., 8 levels each). Similarly, third stage histogram 64 divides the best two adjacent bins of the second into 8 bins: each corresponding to 2 luminance levels (16/8=2). This breakdown of data occurs for both change test 42 and threshold determination 44.

Referring again to FIG. 2, within threshold determination 44, the images can be analyzed in accordance with the estimated temporal noise level. This is estimated through evaluating the current environment: more specifically, through evaluating various light levels, such as the amount of background light, for example. Once the temporal noise level is suitably determined, a threshold determination can be made, where this data is sent to change test 42. For every two consecutive frames, a change test can be conducted for each picture element. The test can compare each image to the previous image, along with the threshold determination from threshold determination 44. If a picture element is detected as unchanged from the previous frame, the corresponding bins of the histogram can be incremented by 1. When a third stage bin in a histogram reaches its maximum height, the corresponding picture element is marked as "to be registered" for the process detailed below.

Note that with the ability to look over a much longer history than simply two frames, the multi-stage histograms described above can offer a memory-efficient method to identify the noise-free values of the "most stationary" pixels in the video. When a picture element is marked "to be registered" the data can be sent to reference registration 48. A value of the corresponding pixel can be registered to a reference buffer. The bins of histograms 60, 62, 64 are then reset and the entire process can be repeated.

Any suitable number of reference buffers may be used. By employing a single buffer, the registered reference can be systematically replaced by a newer value. Alternatively, by employing multiple buffers, more than one reference can be stored. A newer value that differs from the old values may be registered to a new buffer. These values can be determined in reference registration 48, and subsequently sent to video encoder 34a, where they are stored in an appropriate storage location (e.g., reference 50) for use during the skip coding decision process.

Figure 4:
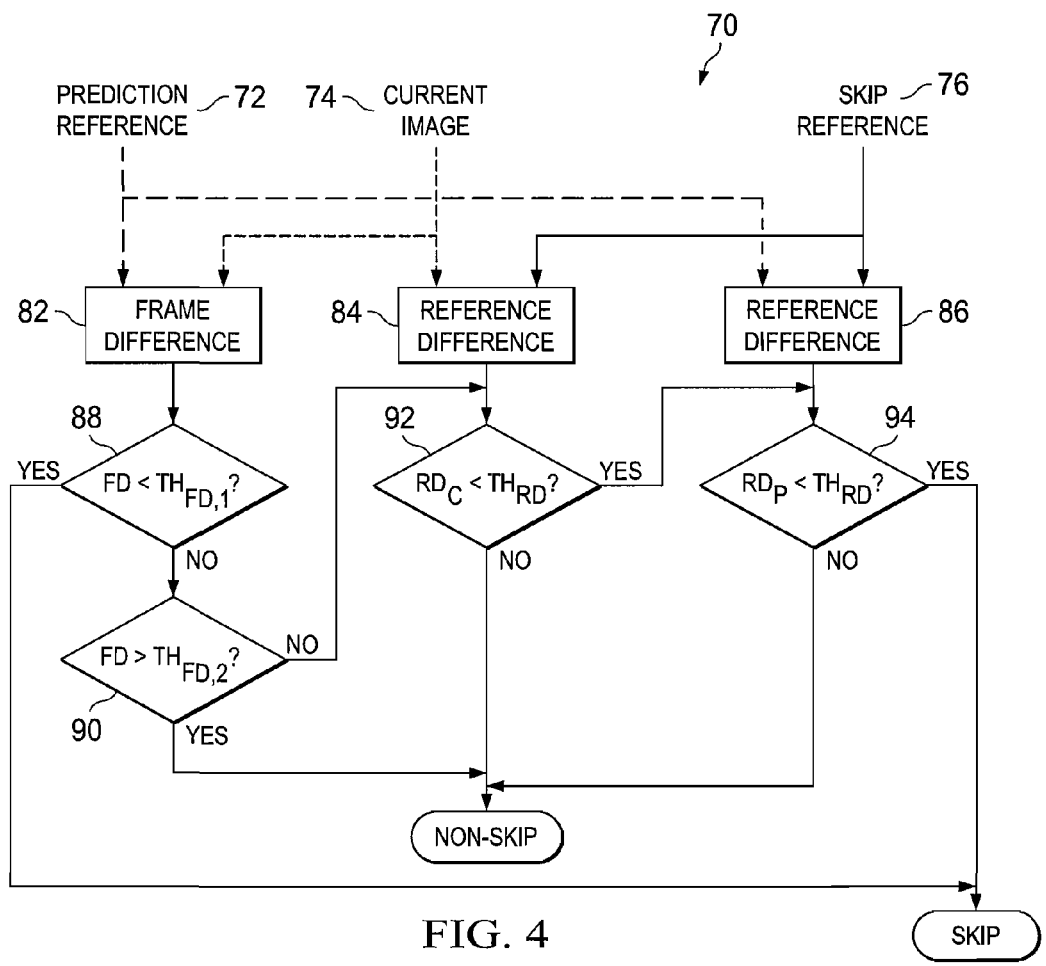
FIG. 4 is a simplified schematic diagram illustrating an example decision tree for making a skip coding determination for a portion of input video.

Referring now to FIG. 4, FIG. 4 is a simplified schematic diagram illustrating an example decision tree 70 for making a skip coding determination for a section of input video. Decision tree 70 shows the logic process that occurs within advanced skip coding module 36a of video encoder 34a in this particular implementation. Advanced skip coding module 36a can receive data from three sources: a prediction reference 72 from video encoder 34a (which is a copy of an encoded preceding image) threshold determination 44, a current image 74 from camera 16, and a skip reference 76 from a storage element (e.g., reference 50) that can comprise pixels registered from reference registration 48. Prediction reference 72 and current image 74 can be compared in order to create a frame difference 82. Current image 74 and skip reference 76 can be compared to create a first reference difference 84. Prediction reference 72 and skip reference 76 can be compared to create a second reference difference 86.

When coding a video frame, skip reference 76 can be used to aid skip-coding decisions. In this embodiment, a single reference buffer is employed, where multiple reference buffers can readily be employed, as well. In this embodiment of FIG. 4, a video block is considered for skip coding when motion search in its proximate neighborhood favors a direct prediction (i.e., zero motion). In such cases, a metric for frame difference 82 is evaluated against two strict thresholds. Depending on the noise level, these thresholds can be selected such that a video block can be coded as skip with confidence, provided the frame difference metric is below a lower threshold at a decision block 88. Alternatively, the video block can be coded as non-skip with confidence, if the frame difference metric is above the larger threshold at a decision block 90. For those that are in between these values, reference difference 84 metric is further evaluated at a decision block 92 between current image 74 and skip reference 76. Subsequently, this can be further evaluated at a decision block 94 between a reference picture (for inter-frame prediction) and skip reference 76, against another properly defined threshold. If for both comparisons the metric is below the threshold, the video block can be coded as a skip candidate.

Figure 5:
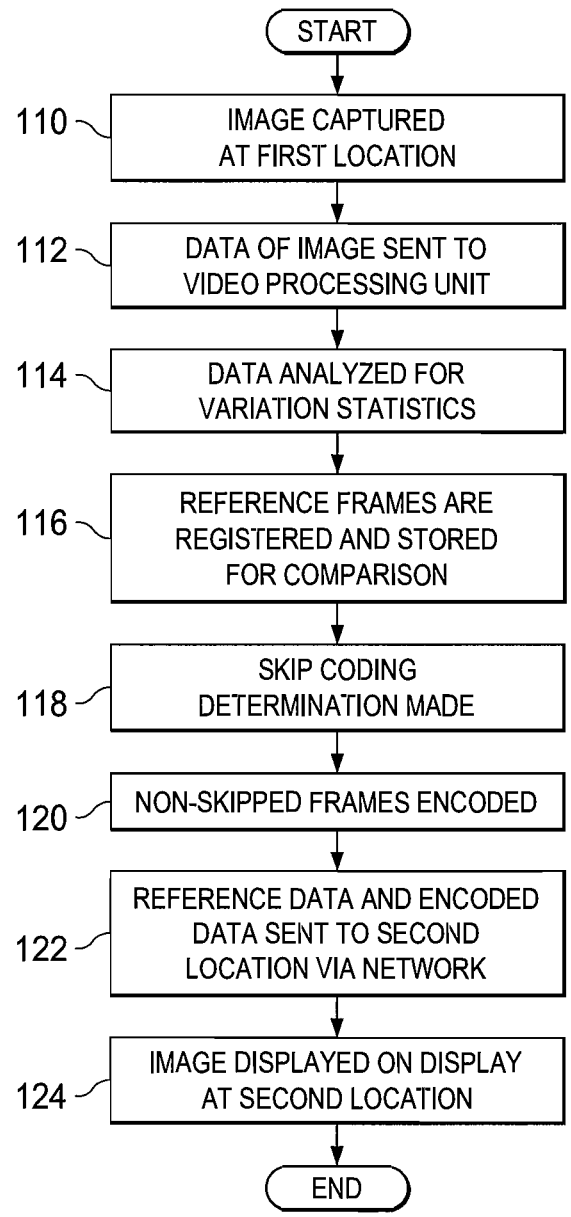
FIG. 5 is a simplified flow diagram illustrating potential operations associated with the system.

Referring now to FIG. 5, FIG. 5 is a simplified flow diagram illustrating one potential operation associated with system 10. The flow may begin at step 110, where a video signal is captured as a series of temporally displaced images. At step 112, the raw image data may be sent to a suitable video processing unit. Step 114 can include analyzing the data for variation statistics. At step 116, reference frames can be registered and stored for subsequent comparison. At the start of the video capture, the first images can form the first reference frames.

The skip coding decision can be made at step 118 and the non-skipped frames can be encoded at step 120. The newly encoded data, along with the reference-encoded data from skipped portions, can be sent to the second location via a network in step 122. This data is then displayed as an image of a video on the display of the second location, as being shown in step 124. In some embodiments, a similar process is occurring at the second location (i.e., the counterparty endpoint), where video data is also being sent from the second location to the first.

Note that in certain example implementations, the video processing functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, endpoints 12, 13 can include software in order to achieve the intelligent skip coding outlined herein. This can be provided through instances of video processing units 17, 27. Additionally, each of these endpoints may include a processor that can execute software or an algorithm to perform skip coding activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each endpoint 12, 13 can also include suitable interfaces for receiving, transmitting, and/or otherwise communicating data or information in a network environment.

It is also important to note that the steps in the preceding flow diagrams illustrate only some of the possible conferencing scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be used on conjunction with the architecture without departing from the teachings of the present disclosure.

Note that with the example provided above, as well as numerous other examples provided herein, interaction may be described in terms of two or three components. However, this has been done for purposes of clarity and example only. In certain cases, it may be easier to describe one or more of the functionalities of a given set of flows by only referencing a limited number of components. It should be appreciated that system 10 (and its teachings) are readily scalable and can accommodate a large number of components, participants, rooms, endpoints, sites, etc., as well as more complicated/sophisticated arrangements and configurations. Accordingly, the examples provided should not limit the scope or inhibit the broad teachings of system 10 as potentially applied to a myriad of other architectures.

Although the present disclosure has been described in detail with reference to particular embodiments, it should be understood that various other changes, substitutions, and alterations may be made hereto without departing from the spirit and scope of the present disclosure. For example, although the previous discussions have focused on videoconferencing associated with particular types of endpoints, handheld devices that employ video applications could readily adopt the teachings of the present disclosure. For example, iPhones, iPads, Google Droids, personal computing applications (i.e., desktop video solutions), etc. can readily adopt and use the skip coding operations detailed above. Any communication system or device that encodes video data would be amenable to the skip coding features discussed herein. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
receiving an input video, wherein data from the input video is analyzed in a plurality of multi-stage histograms to represent variation statistics;
identifying values of pixels from noise associated with a current video image within the video input;
creating a skip-reference video image associated with the identified pixel values;
comparing a portion of the current video image to the skip-reference video image; and
determining a macroblock associated with the current video image to be skipped before an encoding operation occurs.

2. The method of claim 1, further comprising:
encoding non-skipped macroblocks associated with the current video image based on a noise level being above a designated noise threshold.

3. The method of claim 1, wherein the plurality of multi-stage histograms represent variation statistics between a current input video frame and a temporally preceding video frame.

4. The method of claim 3, wherein each of the multi-stage histograms include differing levels of luminance associated with the input video, and wherein if a selected one of the histograms reaches a certain level of luminance, a corresponding pixel of an associated video image is marked to be registered to a reference buffer.

5. The method of claim 1, further comprising:
aggregating non-skipped macroblocks and the skipped macroblock associated with the current video image; and
communicating the macroblocks over a network connection to an endpoint associated with a video conference.

6. The method of claim 1, wherein comparing the portion of the current video image to the skip reference video image is performed in a single reference buffer.

7. The method of claim 1, wherein comparing the portion of the current video image to the skip reference video image is performed in multiple reference buffers.

8. Logic encoded in one or more non-transitory media that includes code for execution and when executed by a processor operable to perform operations comprising:
receiving an input video, wherein data from the input video is analyzed in a plurality of multi-stage histograms to represent variation statistics;
identifying values of pixels from noise associated with a current video image within the video input;
creating a skip-reference video image associated with the identified pixel values;
comparing a portion of the current video image to the skip-reference video image; and
determining a macroblock associated with the current video image to be skipped before an encoding operation occurs.

9. The logic of claim 8, the operations further comprising:
encoding non-skipped macroblocks associated with the current video image based on a noise level being above a designated noise threshold.

10. The logic of claim 8, wherein the plurality of multi-stage histograms represent variation statistics between a current input video frame and a temporally preceding video frame.

11. The logic of claim 10, wherein each of the multi-stage histograms include differing levels of luminance within the input video, and wherein if a selected one of the histograms reaches a certain level of luminance, a corresponding pixel of an associated video image is marked to be registered to a reference buffer.

12. The logic of claim 8, the operations further comprising:
aggregating non-skipped macroblocks and the skipped macroblock associated with the current video image; and
communicating the macroblocks over a network connection to an endpoint associated with a video conference.

13. The logic of claim 8, wherein comparing the portion of the current video image to the skip reference video image is performed in a single reference buffer.

14. The logic of claim 8, wherein comparing the portion of the current video image to the skip reference video image is performed in multiple reference buffers.

15. An apparatus, comprising:
a memory element configured to store code;
a processor operable to execute instructions associated with the code; and
a skip coding module configured to interface with the memory element and the processor such that the apparatus can:
  receive an input video, wherein data from the input video is analyzed in a plurality of multi-stage histograms to represent variation statistics;
  identify values of pixels from noise associated with a current video image within the video input;
  create a skip-reference video image associated with the identified pixel values;
  compare a portion of the current video image to the skip-reference video image; and
  determine a macroblock associated with the current video image to be skipped before an encoding operation occurs.

16. The apparatus of claim 15, wherein the apparatus is further configured to:
encode non-skipped macroblocks associated with the current video image based on a noise level being above a designated noise threshold.

17. The apparatus of claim 15, wherein the
plurality of multi-stage histograms represent variation statistics between a current input video frame and a temporally preceding video frame.

18. The apparatus of claim 17, wherein each of the multi-stage histograms include differing levels of luminance within the input video, and wherein if a selected one of the histograms reaches a certain level of luminance, a corresponding pixel of an associated video image is marked to be registered to a reference buffer.

19. The apparatus of claim 15, wherein the apparatus is further configured to:
aggregate non-skipped macroblocks and the skipped macroblock associated with the current video image; and
communicate the macroblocks over a network connection to an endpoint associated with a video conference.

20. The apparatus of claim 15, wherein the comparison of the portion of the current video image to the skip reference video image is performed in a single reference buffer.

* * * * *